(12) United States Patent
Carter et al.

(10) Patent No.: US 10,021,000 B2
(45) Date of Patent: Jul. 10, 2018

(54) PROVISIONING IN SUPPORT OF AN EMBEDDED CABLE MODEM MAC ADDRESS

(71) Applicant: ARRIS Enterprises LLC, Suwanee, GA (US)

(72) Inventors: Wade E. Carter, Johns Creek, GA (US); Janet Taylor Bean, Underhill, VT (US); Daniel Torbet, Westminster, CO (US); Michael J. Emmendorfer, Saint Peters, MO (US)

(73) Assignee: ARRIS Enterprises LLC, Suwanee, GA (US)

( * ) Notice: Subject to any disclaimer, the term of this patent is extended or adjusted under 35 U.S.C. 154(b) by 121 days.

(21) Appl. No.: 15/174,087

(22) Filed: Jun. 6, 2016

(65) Prior Publication Data

US 2016/0359693 A1      Dec. 8, 2016

Related U.S. Application Data

(60) Provisional application No. 62/171,466, filed on Jun. 5, 2015.

(51) Int. Cl.
| | |
|---|---|
| *H04L 12/26* | (2006.01) |
| *H04L 12/24* | (2006.01) |
| *H04L 12/46* | (2006.01) |
| *H04L 29/08* | (2006.01) |
| *H04L 12/28* | (2006.01) |
| *H04Q 11/00* | (2006.01) |

(52) U.S. Cl.
CPC ...... *H04L 41/5054* (2013.01); *H04L 12/2801* (2013.01); *H04L 12/4633* (2013.01); *H04L 41/0806* (2013.01); *H04L 41/0846* (2013.01); *H04L 67/02* (2013.01); *H04L 67/10* (2013.01); *H04Q 11/0062* (2013.01)

(58) Field of Classification Search
None
See application file for complete search history.

(56) References Cited

U.S. PATENT DOCUMENTS

| | | |
|---|---|---|
| 2011/0131624 A1 | 6/2011 | Wu |
| 2014/0023366 A1 | 1/2014 | Zang et al. |

OTHER PUBLICATIONS

PCT Search Report & Written Opinion, Re: Application No. PCT/US2016/036041, dated Sep. 13, 2016.

*Primary Examiner* — Anh-Vu Ly
(74) *Attorney, Agent, or Firm* — Bart A. Perkins (57) ABSTRACT

Methods, systems, and computer readable media can be operable to facilitate the provisioning of a device using an embedded cable modem media access control (MAC) address. An optical network unit (ONU) may include an embedded cable modem, wherein the embedded cable modem has a dedicated MAC address. Provisioning servers may provide identical configuration files to a virtual cable modem at an optical line termination (OLT) and the embedded cable modem at the ONU. The embedded cable modem MAC address, along with an associated Internet protocol (IP) stack, enables traditional DOCSIS cable modem provisioning and management over a passive optical network.

9 Claims, 4 Drawing Sheets

PROVISIONING IN SUPPORT OF AN EMBEDDED CABLE MODEM MAC ADDRESS

CROSS REFERENCE TO RELATED APPLICATION

This application is a non-provisional application claiming the benefit of U.S. Provisional Application Ser. No. 62/171,466, entitled "DOCSIS Provisioning and Management over Non-DOCSIS Broadband Interface," which was filed on Jun. 5, 2015, and is incorporated herein by reference in its entirety.

TECHNICAL FIELD

This disclosure relates to device provisioning that supports an embedded cable modem MAC address.

BACKGROUND

A cable network system operator, often referred to as a multiple systems operator (MSO) typically provides data and telephony services over a cable modem or telephony modem that operates according to the Data Over Cable Service Interface Specification (DOCSIS) standard and the PacketCable standard for telephony service. DOCSIS provides that communication signals are sent over a hybrid fiber coaxial cable network (HFC) in the downstream direction from a cable modem termination system (CMTS) at an MSO-operated head end to a cable modem or a telephony modem. The HFC also transports communication signals in the upstream direction from the cable modem towards the CMTS.

Typically, a CMTS communicates over a private Internet protocol (IP) network with a myriad of devices, as well as the internet backbone, typically according to a protocol such as Ethernet. The various devices that communicate with a CMTS via an IP network generally may include a video server, a call management server, a billing server, a configuration server, and/or others. It will be appreciated that the various servers include processing components and database components. For example, a configuration server may include a configuration table or database and a processor/interface that, for example, processes connection requests from modems and sends configuration files that are associated with the requesting modem thereto based on an address of the modem. The address may be an IP address, but is typically a media access control (MAC) layer address.

As more and more consumers desire higher bandwidth services, and as MSOs provide more and more high bandwidth content, the traffic-carrying capacity of an HFC is strained and actually poses a limitation on the amount of the high-bandwidth-need traffic signals that can be delivered from a head end to consumers.

Thus, MSOs have begun to seek ways to obtain higher capacity than an HFC provides. MSOs are increasingly interested in using a passive optical network (PON) to carry content, including data, voice and video, but MSOs want to minimize investment in equipment. Thus, many MSOs wish to use as much of their existing equipment as possible, such as call management servers, billing servers, configuration servers, and other equipment that couples to the CMTS via a private IP network, and even the CMTS itself.

Although DOCSIS traffic can be carried over a PON, PON and DOCSIS use different protocols, control messages and addressing methods for sending a data packet from one location to another. Thus, there is a need in the art for a method and system that allows an MSO to continue to use existing head end equipment to send and receive DOCSIS traffic over a PON instead of an HFC network.

Cable operators are beginning to deploy Ethernet passive optical network (EPON) based gateways as an overlay or long term migration to/from traditional HFC networks. However, cable operators have made massive investments in back office systems that are built around certain standards (e.g., Cablelabs DOCSIS, PacketCable, and eRouter standards). Thus a problem is created by the inability to integrate customer premise equipment (CPE) devices that use EPON, as opposed to DOCSIS, as a broadband access technology while also preserving investments in back office systems and investments associated with DOCSIS based broadband access.

Currently, specifications such as the DOCSIS provisioning of Ethernet (DPoE) specification, are not developed to the point of supporting all DOCSIS functions like DOCSIS configuration file processing of PacketCable and eRouter TLVs, SNMP MIB TLVs, secure software download, and HTTP/telnet/SSH/SNMP management interfaces. Therefore, it is desirable to improve upon methods and systems for provisioning an ONU over a PON.

BRIEF DESCRIPTION OF THE DRAWINGS

Like reference numbers and designations in the various drawings indicate like elements.

DETAILED DESCRIPTION

As a preliminary matter, it readily will be understood by those persons skilled in the art that the present invention is susceptible of broad utility and application. Many methods, embodiments and adaptations of the present invention other than those herein described, as well as many variations, modifications, and equivalent arrangements, will be apparent from or reasonably suggested by the present invention and the following description thereof, without departing from the substance or scope of the present invention.

Accordingly, while the present invention has been described herein in detail in relation to preferred embodiments, it is to be understood that this disclosure is only illustrative and exemplary of the present invention and is made merely for the purposes of providing a full and enabling disclosure of the invention. The disclosure is not intended nor is to be construed to limit the present invention or otherwise to exclude any such other embodiments, adaptations, variations, modifications and equivalent arrangements, the present invention being limited only by the claims appended hereto and the equivalents thereof.

It is desirable to improve upon methods and systems for provisioning an optical network unit (ONU) over a PON.

Methods, systems, and computer readable media can be operable to facilitate the provisioning of a device using an embedded cable modem media access control (MAC) address. An ONU may include an embedded cable modem, wherein the embedded cable modem has a dedicated MAC address. Provisioning servers may provide identical configuration files to a virtual cable modem at an optical line termination (OLT) and the embedded cable modem at the ONU. The embedded cable modem MAC address, along with an associated Internet protocol (IP) stack, enables traditional DOCSIS cable modem provisioning and management over a passive optical network.

An embodiment of the invention described herein may include a method comprising: (a) establishing a connection between an optical network unit and a virtual cable modem, wherein the optical network unit comprises an embedded cable modem, the embedded cable modem having a dedicated media access control address; (b) outputting a configuration request, wherein the configuration request includes an identification of the media access control address dedicated to the embedded cable modem; (c) receiving a first configuration file at the embedded cable modem, wherein the first configuration file is identical to a second configuration file, the second configuration file being delivered to and received by the virtual cable modem; and (d) provisioning the optical network unit according to one or more configuration parameters received by the embedded cable modem within the configuration file.

According to an embodiment of the invention, the first configuration file and the second configuration file are received from a data over cable service interface specification (DOCSIS) provisioning server.

According to an embodiment of the invention, the first configuration file is received at the optical network unit over a passive optical network.

According to an embodiment of the invention, the first configuration file does not include parameters associated with DOCSIS physical layer operations.

An embodiment of the invention described herein may include an optical network unit comprising: (a) an embedded cable modem having a dedicated media access control address; (b) one or more modules configured to establish a connection between the embedded cable modem and a virtual cable modem; (c) one or more interfaces configured to be used to: (i) output a configuration request, wherein the configuration request includes an identification of the media access control address dedicated to the embedded cable modem; and (ii) receive a first configuration file, wherein the first configuration file is identical to a second configuration file, the second configuration file being delivered to and received by the virtual cable modem; and (d) wherein the one or more modules are further configured to provision the optical network unit according to one or more configuration parameters received by the embedded cable modem within the configuration file.

An embodiment of the invention described herein may include one or more non-transitory computer readable media having instructions operable to cause one or more processors to perform the operations comprising: (a) establishing a connection between an optical network unit and a virtual cable modem, wherein the optical network unit comprises an embedded cable modem, the embedded cable modem having a dedicated media access control address; (b) outputting a configuration request, wherein the configuration request includes an identification of the media access control address dedicated to the embedded cable modem; (c) receiving a first configuration file at the embedded cable modem, wherein the first configuration file is identical to a second configuration file, the second configuration file being delivered to and received by the virtual cable modem; and (d) provisioning the optical network unit according to one or more configuration parameters received by the embedded cable modem within the configuration file.

Figure 1:
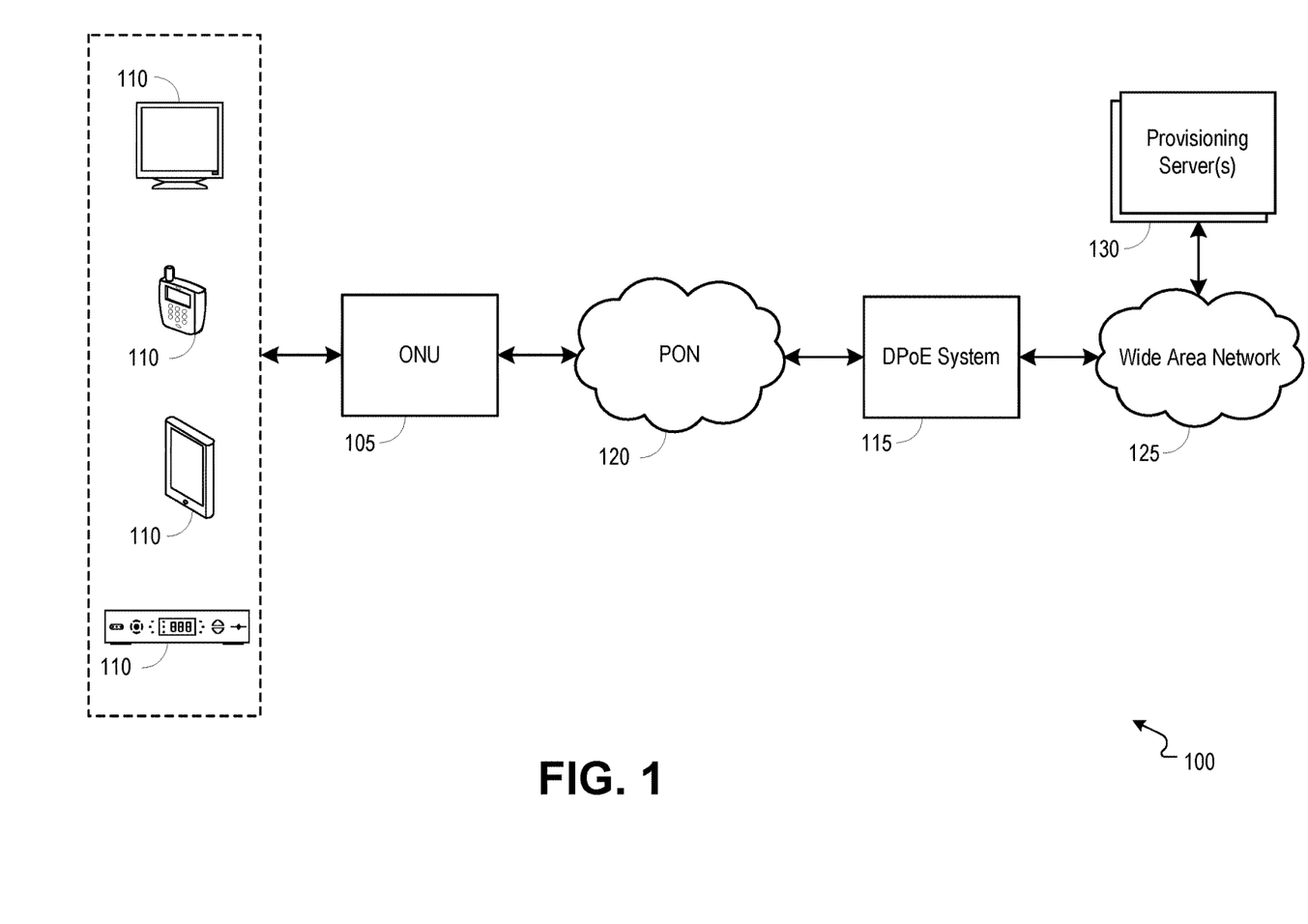
FIG. 1 is a block diagram illustrating an example network environment operable to facilitate the provisioning of a device using an embedded cable modem media access control (MAC) address.

FIG. 1 is a block diagram illustrating an example network environment 100 operable to facilitate the provisioning of a device using an embedded cable modem media access control (MAC) address. In embodiments, one or more optical network units (ONU) 105 may be installed outside of or within a subscriber premise and may be configured to provide one or more services (e.g., video, data, voice services, etc.) to one or more client devices 110 (e.g., television, computer, tablet, mobile device, set-top box (STB), telephone, and others). The one or more services may be provided to the ONU 105 from a DOCSIS provisioning of Ethernet (DPoE) system 115, and the one or more services may be delivered to the ONU 105 over a passive optical network (PON) 120. The DPoE system 115 may receive downstream communications from, and may output upstream communications to a wide area network (WAN) 125.

In embodiments, the DPoE system 115 may include a virtual cable modem (vCM) and an optical line terminal (OLT). The vCM and/or OLT may be configured to output communications received from the WAN 125 to a designated ONU 105.

In embodiments, one or more provisioning servers 130 may provide configuration information to provision an ONU 105 for offering one or more specific services. The one or more provisioning servers 130 may reside within a back office or multiple systems operator (MSO)-controlled servers. As an example, the one or more provisioning servers 130 may include a configuration server which may forward a configuration file associated with an ONU 105. The configuration file may include various operating parameters associated with the ONU 105 such as Quality of Service (QoS) parameters (e.g., bandwidth parameters and others). In embodiments, communications delivered from the one or more provisioning servers 130 to an ONU 105 may be addressed to an embedded cable modem (e.g., the MAC address of the embedded cable modem) residing at the ONU 105.

When an ONU 105 ranges and registers with an OLT of the DPoE system 115, the embedded cable modem may send a dynamic host configuration protocol (DHCP) discover and request message sequence to a DHCP server residing at the one or more provisioning servers 130 using the MAC address of the embedded cable modem as the client address. The DHCP server may respond with a reply message that contains a configuration based on the MAC address of the embedded cable modem.

In embodiments, the embedded cable modem of the ONU 105 allows the ONU 105 to support various DOCSIS based protocols (e.g., PacketCable, eRouter, etc.), provisioning, and management methods. A DOCSIS provisioning system may support two different MAC addresses and a common, identical configuration file. The two MAC addresses may include an ONU MAC address which is also used for provisioning the DPoE virtual cable modem of the OLT at the DPoE system 115, and a MAC address of the embedded cable modem at the ONU 105. Using the identical configuration files, the ONU MAC address may enable DPoE Ethernet passive optical network (EPON) provisioning and the embedded cable modem MAC address may enable traditional DOCSIS customer premise equipment (CPE) provisioning.

The ONU MAC address may effectuate a replacement of a DOCSIS physical/MAC layer hardware with an EPON MAC layer within an ONU 105. DOCSIS provisioning and management systems are organized around the existence of a cable modem MAC address and Internet protocol (IP) stack. As EPON does not specify an IP layer, traditional DOCSIS back office systems lack the needed information for the provisioning and management of DOCSIS eSAFES (embedded service/application functional entities). By introducing the embedded Cable Modem MAC address and IP stack, the organizing principle of a cable modem MAC/IP address is preserved along with back office system and CPE software which are built around that organizing principle.

In embodiments, the embedded cable modem may have its own MAC and DOCSIS device certificates, in addition to the ONU MAC address, which may be used to obtain an IP address and perform the DOCSIS IP layer provisioning functions. For example, the embedded cable modem may implement IP layers and various other functions such as DHCP, TFTP (trivial file transfer protocol), configuration file download, secure software download, WebGUI, telnet/SSH (secure shell) management access, and others.

In embodiments, after an EPON link occurs, the embedded cable modem may initiate a normal start-up process (e.g., DHCP, TFTP configuration file download, ToD (time of day), etc.). After the start-up process is initiated, the functions performed by the traditional DOCSIS layer become available. These functions may include, but are not limited to, embedded cable modem management interfaces (e.g., HTTP (hypertext transfer protocol), telnet, SSH, SNMP (simple network management protocol), etc.), ToD, eDOCSIS MIBs (management information base) (e.g., docsDevResetnow), DOCSIS configuration file processing of eSAFES (e.g., eSAFE TLVs (type-length-value) for eRouter and eSTB interfaces), cable modem interface control of eDOCSIS defined interfaces (e.g., for Ethernet, MTA (multimedia terminal adapter), Wi-Fi radio, Wi-Fi SSIDs (service set identifier), etc.), cable modem interface management (CMIM), DOCSIS secure software download, and others.

The unique embedded cable modem MAC address of the ONU 105 permits the ONU 105 to offer systems and services such as eUE (user equipment)/voice (e.g., UE or eMTA/Voice provisioning flow kick-off, UE/eMTA use of IPv4 vs. IPv6 (ToD, voice proprietary MIBs in cable modem configuration file), eRouter (e.g., eRouter eSafe TLVs in cable modem configuration file), commercial services cable modem/router (e.g., configuration change to use a public IP on the eRouter (instead of cable modem IP)), general device configuration (e.g., proprietary device-level MIBs in the cable modem configuration file), and others.

Figure 2:
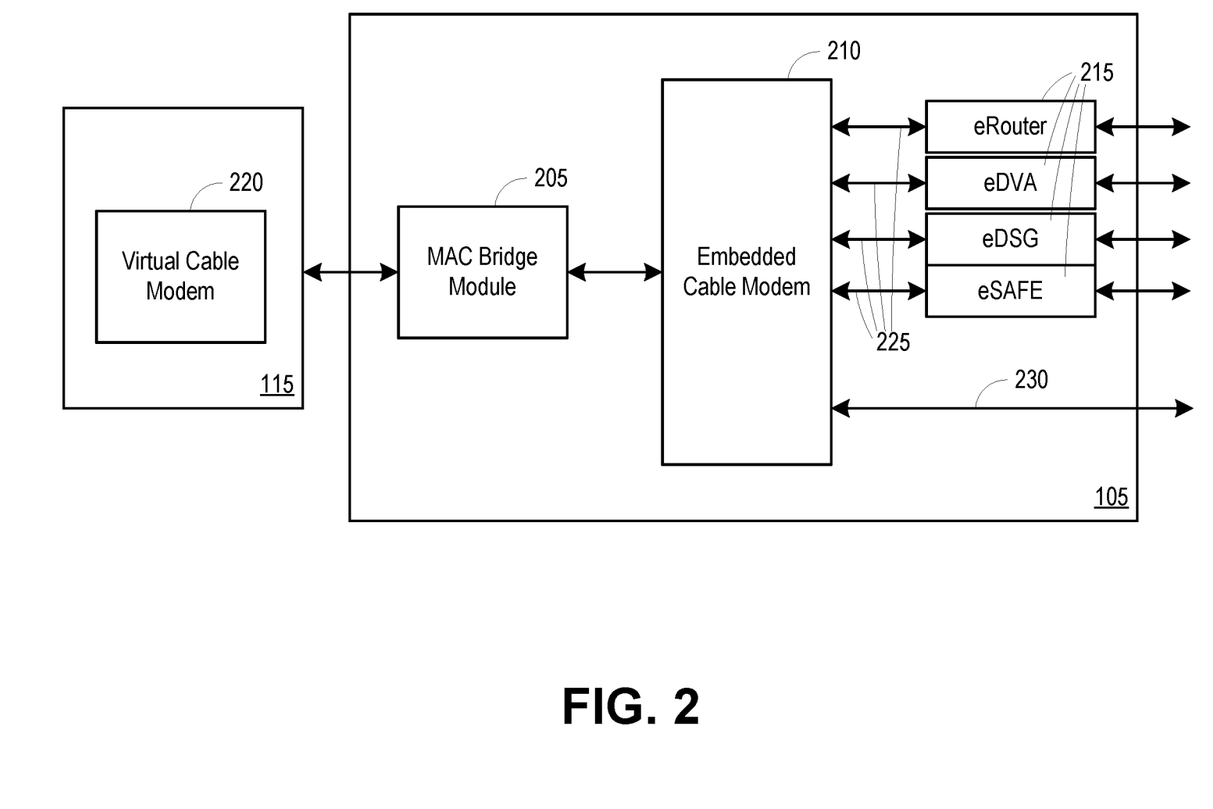
FIG. 2 is a block diagram illustrating an example ONU operable to facilitate the provisioning of a device using an embedded cable modem MAC address.

FIG. 2 is a block diagram illustrating an example ONU 105 operable to facilitate the provisioning of a device using an embedded cable modem MAC address. The ONU 105 may include a MAC bridge module 205, an embedded cable modem 210, and one or more embedded service interfaces 215 (e.g., eRouter, eDVA (embedded digital voice adapter), eDSG (DOCSIS set-top gateway), eSAFE, etc.).

In embodiments, the ONU 105 may support the delivery of one or more services to one or more client devices (e.g., client devices 110 of FIG. 1). Each of the one or more services may be supported by dedicated embedded service interface 215. For example, an eRouter may be utilized to provide data services, a PacketCable embedded MTA or user equipment (UE) may be utilized for voice services, and an embedded set top box (eSTB) may be utilized for traditional QAM (quadrature amplitude modulation) video services. The ONU 105 and DPoE system 115 may be enabled as network layer for transport of eDOCSIS, eRouter, eDVA, eWiFi, and others. DPoE specifications and systems may be utilized to provision network layer and QoS and/or LLID (local link identifier) classifiers that will identify traffic from eRouter, eDVA, eWiFi, and others between the ONU 105 and DPoE system 115. In embodiments, eDOCSIS IP layer and other specifications may be utilized for provisioning and management of DOCSIS elements that are independent of an EPON MAC address, thereby allowing PacketCable, eMTA/eDVA, eRouter, eDVA, and others to be provisioned with few or virtually no changes to current eMTA and eRouter provisioning and management methods and systems.

In embodiments, the ONU 105 may be configured with one or more of the following MAC addresses: ONU MAC (for OLT provisioning with the virtual cable modem 220); embedded cable modem MAC along with DOCSIS device certificates; eMTA MAC along with PacketCable device certificates; eRouter MAC; MACs for LAN (local area network) side interfaces (e.g., Ethernet, Wi-Fi, multimedia over coax alliance (MoCA), etc.); eSTB MAC for video services; and others.

In embodiments, the MAC bridge module 205 may utilize classifiers of the ONU 105 and the one or more embedded service interfaces 215 to provision the ONU 105 and the one or more embedded service interfaces 215 according to a configuration file. The classifier of the ONU 105 may be identified and described by a classifier-ONU (CO) reference point. This reference point may be utilized by the MAC bridge module 205 for describing classification, scheduling, and forwarding functions required for interoperability between one or more upstream servers (e.g., provisioning server(s) 130 of FIG. 1) or DPoE system 115 and the ONU 105. The classifiers of the individual embedded service interfaces 215 may be identified and described by secondary reference points, wherein each secondary reference point describes either a virtual (logical) (e.g., logical interface(s) 225) or a real (external) Ethernet port (e.g., physical interface 230) of the ONU 105. The one or more secondary reference points may be utilized by the MAC bridge module to provide a logical means for common requirements for each of the embedded service interfaces 215. An individual embedded service interface 215 may be provisioned with specific configuration parameters through a corresponding secondary reference point.

Back office DOCSIS provisioning (e.g., provisioning server(s) 130 of FIG. 1) may accept multiple cable modem MAC addresses (e.g., ONU MAC address and embedded cable modem MAC address) associated with the ONU 105, and DOCSIS provisioning may provide identical configuration files to both the virtual cable modem 115 (in OLT or DPoE system 115) and the embedded cable modem 210 (in ONU 105). DHCP options may be used to differentiate between the configuration files and targets (e.g., virtual cable modem 115 and embedded cable modem 210). Back office management systems may recognize the embedded cable modem MAC address and refrain from performing DOCSIS physical layer/MAC layer operations (e.g., query primary and secondary channels, RF (radio frequency) transmit power level, and other operations which have no meaning or use in an EPON system).

The EPON layer may be managed primarily from DPoE infrastructure using DOCSIS service flow filters and classifiers (mapped into EPON LLIDs by the virtual cable modem 220) and EPON subsystem software. For example, the eSAFE SoC (system on chip) telephony gateway and voice management infrastructure may be managed using a TFTP configuration model. As another example, eDOCSIS ToD may be used in place of ToD from a NTP (network time protocol) server to an eSAFE/eRouter.

DOCSIS back offices (e.g., provisioning server(s) 130 of FIG. 1) may utilize the virtual cable modem 220 for provisioning EPON layer at an OLT of the DPoE system 115 and the ONU 105. DOCSIS secure software download may be utilized to update the EPON layer on the ONU 105. DOCSIS SoC may be upgraded via secure software download to the embedded cable modem 210. Management and configuration of the eRouter may be facilitated using communications (e.g., TR-069/TR-181) routed to an eRouter IP address.

The EPON subsystem may be upgraded via a DPoE software download mechanism. DOCSIS SoC (eMTA/UE and eRouter) may be upgraded via a DOCSIS-like mechanism using TFTP or HTTP download from an eRouter IP address, TR-069 defined load management mechanism to eRouter IP address, MSO method using eRouter IP address, and may be facilitated using DOCSIS secure software download to the embedded cable modem 210.

Figure 3:
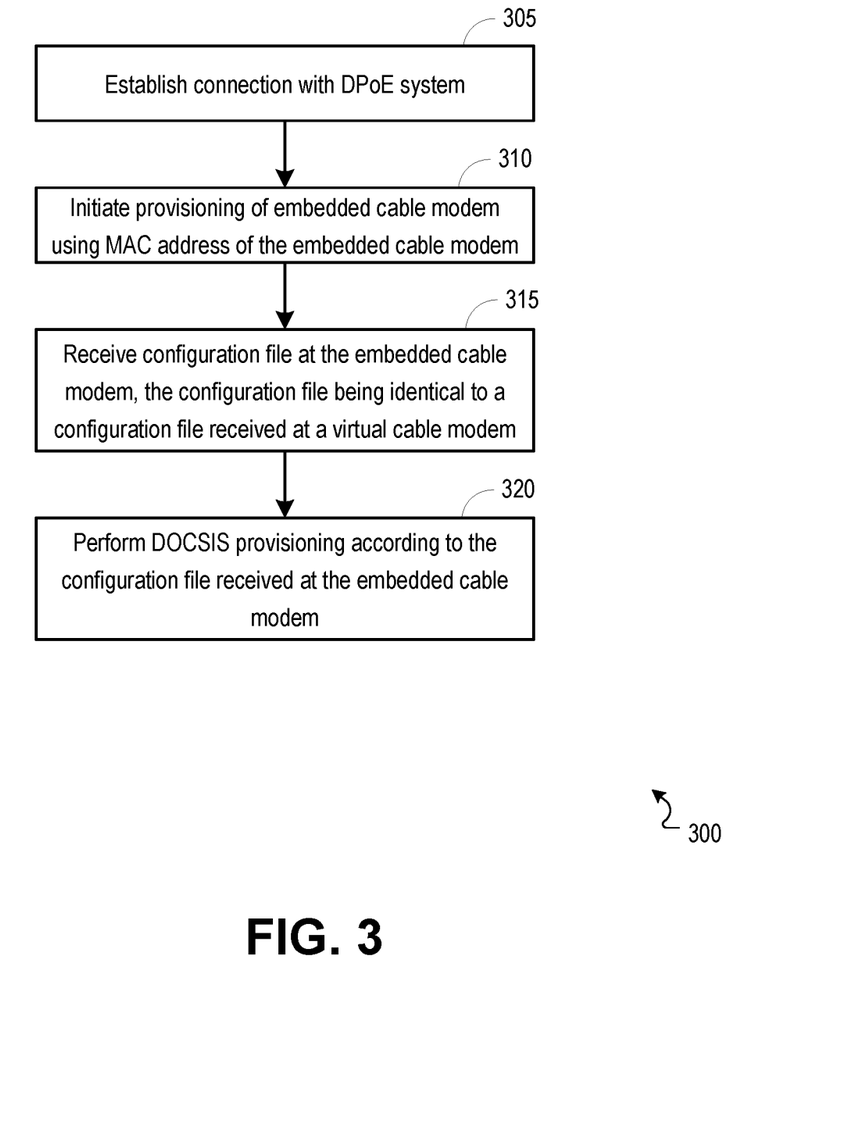
FIG. 3 is a flowchart illustrating an example process operable to facilitate the provisioning of a device using an embedded cable modem MAC address.

FIG. 3 is a flowchart illustrating an example process 300 operable to facilitate the provisioning of a device using an embedded cable modem MAC address. The process 300 may be carried out, for example, by an ONU 105 of FIG. 1 or any other device configured to deliver multimedia to one or more client devices 110 of FIG. 1. The process 300 can begin at 305, when a connection between the ONU 105 and a DPoE system (e.g., DPoE system 115 of FIG. 1) is established.

At 310, provisioning of the ONU 105 may be initiated. In embodiments, the ONU 105 may request provisioning using a MAC address associated with an embedded cable modem 210 of FIG. 2. For example, the ONU 105 may be configured with at least two MAC addresses (e.g., an ONU MAC address and an embedded cable modem MAC address), and the ONU 105 may submit the MAC address that is dedicated to the embedded cable modem 210 to an upstream provisioning server (e.g., provisioning server(s) 130 of FIG. 1).

At 315, a configuration file may be received at the embedded cable modem 210. In embodiments, the configuration file received at the embedded cable modem 210 may be identical to a configuration file received at a virtual cable modem of an OLT (e.g., virtual cable modem 220 of FIG. 2 of the DPoE system 115 of FIG. 1). The configuration file may be received from a DOCSIS back office (e.g., provisioning server(s) 130 of FIG. 1) and may include configuration parameters for the embedded cable modem 210 and one or more logical and/or physical interfaces (e.g., embedded service interfaces 215 of FIG. 2).

At 320, DOCSIS provisioning may be performed at the ONU 105 according to the configuration file received at the embedded cable modem 210. In embodiments, the embedded cable modem 210 and one or more logical and/or physical links (e.g., embedded service interfaces 215 of FIG. 2) may be provisioned with configuration parameters identified from the configuration file.

Figure 4:
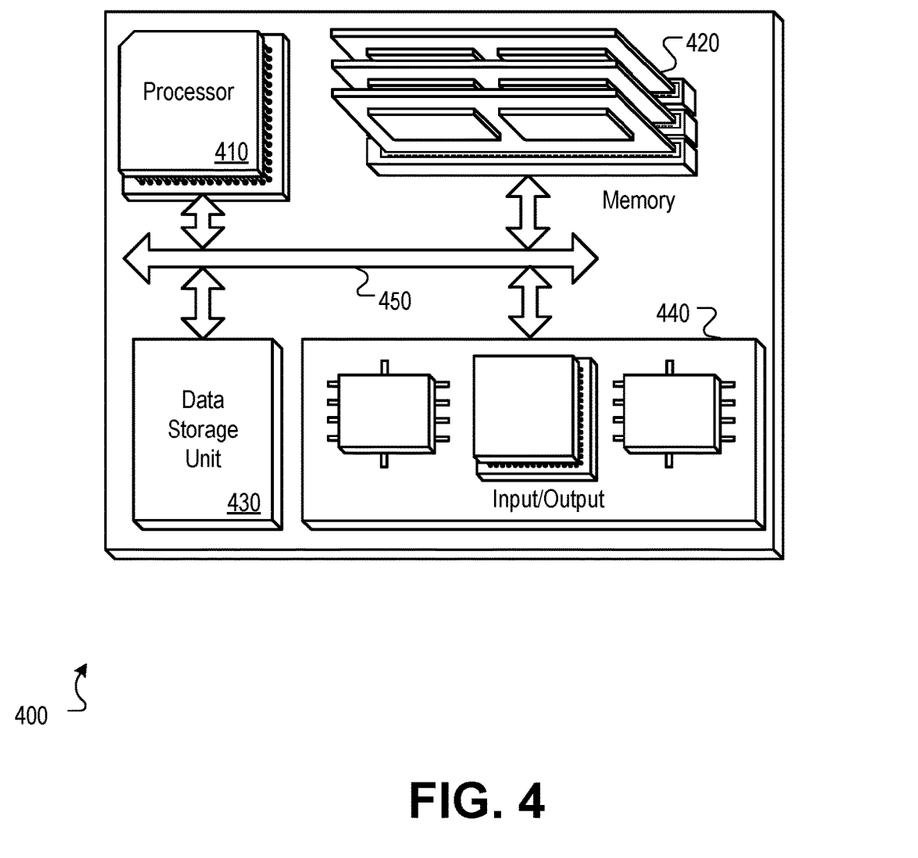
FIG. 4 is a block diagram of a hardware configuration operable to facilitate the provisioning of a device using an embedded cable modem MAC address.

FIG. 4 is a block diagram of a hardware configuration 400 operable to facilitate the provisioning of a device using an embedded cable modem MAC address. The hardware configuration 400 can include a processor 410, a memory 420, a storage device 430, and an input/output device 440. Each of the components 410, 420, 430, and 440 can, for example, be interconnected using a system bus 450. The processor 410 can be capable of processing instructions for execution within the hardware configuration 400. In one implementation, the processor 410 can be a single-threaded processor. In another implementation, the processor 410 can be a multi-threaded processor. The processor 410 can be capable of processing instructions stored in the memory 420 or on the storage device 430.

The memory 420 can store information within the hardware configuration 400. In one implementation, the memory 420 can be a computer-readable medium. In one implementation, the memory 420 can be a volatile memory unit. In another implementation, the memory 420 can be a non-volatile memory unit.

In some implementations, the storage device 430 can be capable of providing mass storage for the hardware configuration 400. In one implementation, the storage device 430 can be a computer-readable medium. In various different implementations, the storage device 430 can, for example, include a hard disk device, an optical disk device, flash memory or some other large capacity storage device. In other implementations, the storage device 430 can be a device external to the hardware configuration 400.

The input/output device 440 provides input/output operations for the hardware configuration 400. In embodiments, the input/output device 440 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video and/or data services to a client device 110 of FIG. 1 (e.g., television, mobile device, tablet, computer, STB, telephone, etc.). In embodiments, the input/output device can include driver devices configured to send communications to, and receive communications from one or more networks (e.g., PON 120 of FIG. 1, WAN 125 of FIG. 1, etc.).

Those skilled in the art will appreciate that the invention improves upon methods and systems for provisioning an ONU over a PON. Methods, systems, and computer readable media can be operable to facilitate the provisioning of a device using an embedded cable modem media access control (MAC) address. An optical network unit (ONU) may include an embedded cable modem, wherein the embedded cable modem has a dedicated MAC address. Provisioning servers may provide identical configuration files to a virtual cable modem at an optical line termination (OLT) and the embedded cable modem at the ONU. The embedded cable modem MAC address, along with an associated Internet protocol (IP) stack, enables traditional DOCSIS cable modem provisioning and management over a passive optical network.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:

1. A method comprising:
    establishing a connection between an optical network unit and a virtual cable modem, wherein the optical network unit comprises one or more embedded service interfaces and an embedded cable modem, the embedded cable modem having a dedicated media access control address, and wherein the optical network unit is configured with a media access control address dedicated to the optical network unit and a media access control address dedicated to the embedded cable modem;
    outputting a configuration request, wherein the configuration request includes an identification of the media access control address dedicated to the embedded cable modem;
    receiving a first configuration file at the embedded cable modem, wherein the first configuration file is identical to a second configuration file, the second configuration file being delivered to and received by the virtual cable modem, wherein the first configuration file comprises configuration parameters for the embedded cable modem and configuration parameters for the one or more embedded service interfaces, and wherein the first configuration file does not include parameters associated with DOCSIS physical layer operations; and
    provisioning the optical network unit according to one or more configuration parameters received by the embedded cable modem within the first configuration file.

2. The method of claim 1, wherein the first configuration file and the second configuration file are received from a data over cable service interface specification (DOCSIS) provisioning server.

3. The method of claim 1, wherein the first configuration file is received at the optical network unit over a passive optical network.

4. An optical network unit, wherein the optical network unit is configured with a media access control address dedicated to the optical network unit, and wherein the optical network unit comprises:
    an embedded cable modem having a dedicated media access control address;
    one or more embedded service interfaces;
    one or more modules that establish a connection between the embedded cable modem and a virtual cable modem;
    one or more interfaces that:
    output a configuration request, wherein the configuration request includes an identification of the media access control address dedicated to the embedded cable modem; and
    receive a first configuration file, wherein the first configuration file is identical to a second configuration file, the second configuration file being delivered to and received by the virtual cable modem, wherein the first configuration file comprises configuration parameters for the embedded cable modem and configuration parameters for the one or more embedded service interfaces, and wherein the first configuration file does not include parameters associated with DOCSIS physical layer operations; and wherein the one or more modules further provision the optical network unit according to one or more configuration parameters received by the embedded cable modem within the first configuration file.

5. The optical network unit of claim 4, wherein the first configuration file and the second configuration file are received from a data over cable service interface specification (DOCSIS) provisioning server.

6. The optical network unit of claim 4, wherein the first configuration file is received at the optical network unit over a passive optical network.

7. One or more non-transitory computer readable media having instructions operable to cause one or more processors to perform the operations comprising:

establishing a connection between an optical network unit and a virtual cable modem, wherein the optical network unit comprises one or more embedded service interfaces and an embedded cable modem, the embedded cable modem having a dedicated media access control address, and wherein the optical network unit is configured with a media access control address dedicated to the optical network unit and a media access control address dedicated to the embedded cable modem;

outputting a configuration request, wherein the configuration request includes an identification of the media access control address dedicated to the embedded cable modem;

receiving a first configuration file at the embedded cable modem, wherein the first configuration file is identical to a second configuration file, the second configuration file being delivered to and received by the virtual cable modem, wherein the first configuration file comprises configuration parameters for the embedded cable modem and configuration parameters for the one or more embedded service interfaces, and wherein the first configuration file does not include parameters associated with DOCSIS physical layer operations; and provisioning the optical network unit according to one or more configuration parameters received by the embedded cable modem within the first configuration file.

8. The one or more non-transitory computer-readable media of claim 7, wherein the first configuration file and the second configuration file are received from a data over cable service interface specification (DOCSIS) provisioning server.

9. The one or more non-transitory computer-readable media of claim 7, wherein the first configuration file is received at the optical network unit over a passive optical network.

* * * * *